UNITED STATES PATENT OFFICE.

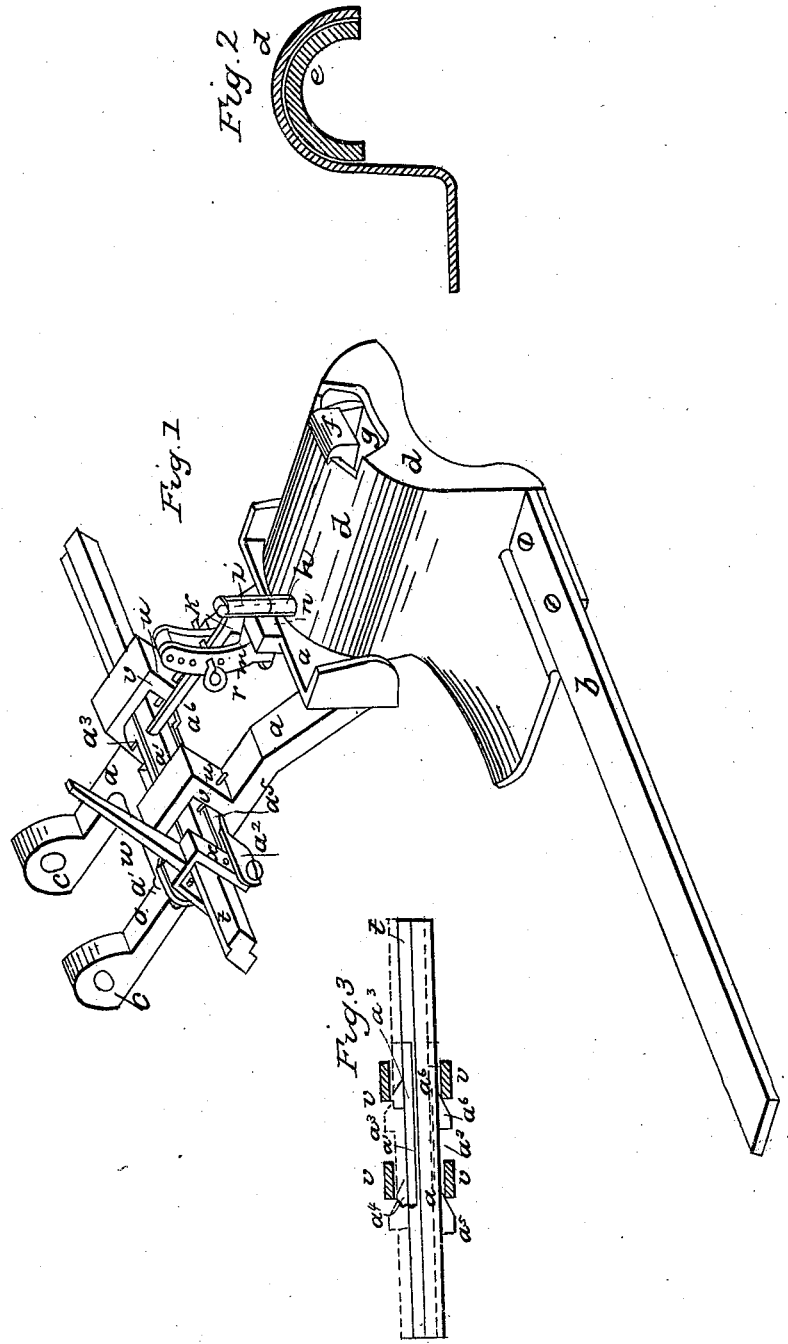

W. S. STETSON, OF BALTIMORE, MARYLAND.

IMPROVEMENT IN HARVESTING-MACHINES.

Specification forming part of Letters Patent No. 24,062, dated May 17, 1859.

*To all whom it may concern:*

Be it known that I, W. S. STETSON, of Baltimore, in the county of Baltimore and State of Maryland, have invented certain Improvements in Harvesters; and I do hereby declare that the following is a full, clear, and exact description of the principle or character which distinguishes them from all other things before known, and of the usual manner of making, modifying, and using the same, reference being had to the accompanying drawings, of which—

Figure 1 is a perspective view of the several improvements; Fig. 2, a cross-section through the saddle-piece $d$, and Fig. 3 a horizontal section of the device for shifting gear.

My invention consists in a peculiar mode of connecting the finger-bar of harvesters with the frame-work, and also a peculiar combination and arrangement of parts for throwing the machinery in and out of gear, described and represented as follows:

$a$ is the frame-work, to which the knife-bar $b$ is attached, and this frame-work is hung upon the carriage-axle of the harvester at $c$. The finger-bar $b$ is secured by bolts to a saddle-piece, $d$, which rides upon an arched projection, $e$, upon the lower part of frame $a$. This projection is provided with a check or check-piece, $f$, of the form shown in the drawings, which piece passes through a suitable opening, $g$, in the saddle-piece, and keeps the saddle in place and restrains its motions to the required limits.

Upon the post $h$, fixed upon the saddle, is a movable thimble, $i$, to which is attached the handle or lever-bar $k$, so that the handle may turn about the axis of post $h$.

Upon the frame is a swiveling guide or adjusting-rack, $m$, its pivot being at $n$. The handle $k$ passes through the longitudinal opening in the rack $m$, and is kept at various heights in this opening by the pin $r$. The purpose of the guide $m$ and handle $k$ is to adjust the height of the cutters, while the swiveling of the guide-piece accommodates it to the motions of the saddle-piece as it turns upon the projection $e$.

For the purpose of throwing the machinery in and out of gear, I have adopted the following device: As this device is applicable to harvesters of various constructions it is not deemed necessary to show the driving-gear and the connections with the cutter-bar, and for the present purpose we will suppose the driving-pinion of a harvester is any way connected with the shifting-bar $t$, Figs. 1 and 3. As this bar moves back and forth parallel to its length it carries the pinion in and out of gear. The motion of the bar is effected as follows: $t$ is a bar of metal of the form shown in Fig. 1. This bar slides laterally upon the rods $u$, which are supported in the uprights $v$ on the frame $a$. A forked lever, $w$, embraces this bar, being pivoted to it at $x$, and connected with each arm of the fork are sliding bars $a'$ $a^2$, carrying each two wedges, $a^3$ $a^4$ $a^5$ $a^6$. The bar $a'$ is pivoted to the forked lever above the lever-pivot $x$, and as the lever is carried toward the frame $a$ its wedges $a^3$ $a^4$ are forced through between the sides or walls of the rabbet $e'$ and the uprights $v$, and move the bar $t$ laterally toward the rear of the machine, and thus, we may suppose, carry a pinion into gear with the main gear or the driving-wheel. The bar $a^2$ is connected below the pivot $x$, and of course on each movement of the lever $w$ its motion is in an opposite direction to that of $a'$, while its mode of action is similar, and by the alternate action of these wedge-bars the back-and-forth movement of the shifting-bar is accomplished. The motion of the finger-bar in its vertical plane is here shown to be somewhat limited; but it may have any extent of motion desired in that direction.

What I claim as my invention and improvement in harvesters is—

1. Connecting the finger-bar to the frame of the machine by means of the saddle and its support, constructed and arranged substantially as herein described.

2. In combination with the saddle $d$, the swiveling guide and swiveling lever $k$, as set forth.

3. Throwing the cutters in and out of gear by means of the shifting-bar $t$, constructed and operated substantially in the manner set forth.

W. S. STETSON.

Witnesses:
 CHAS. G. PAGE,
 WM. H. HARRISON.